(12) United States Patent
Driscoll et al.

(10) Patent No.: US 10,581,175 B2
(45) Date of Patent: Mar. 3, 2020

(54) WINDSHIELD SMART REFLECTOR SYSTEMS AND METHODS

(71) Applicant: Elwha LLC, Bellevue, WA (US)

(72) Inventors: Tom Driscoll, San Diego, CA (US); Roderick A. Hyde, Redmond, WA (US); Jordin T. Kare, San Jose, CA (US); David R. Smith, Durham, NC (US); Clarence T. Tegreene, Mercer Island, WA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 715 days.

(21) Appl. No.: 14/732,138

(22) Filed: Jun. 5, 2015

(65) Prior Publication Data

US 2016/0359235 A1    Dec. 8, 2016

(51) Int. Cl.
*H01Q 15/14* (2006.01)
*H01Q 15/23* (2006.01)

(52) U.S. Cl.
CPC .......... *H01Q 15/148* (2013.01); *H01Q 15/23* (2013.01)

(58) Field of Classification Search
CPC .......... F41J 2/00; H01Q 15/14; H01Q 15/147; H01Q 15/148; H01Q 15/23; G01S 7/48; G01S 7/481; G01S 17/93; G01S 17/936; G01S 2013/9367; G01S 2013/9375; G01S 2013/9392; G02B 5/32; G02B 5/0252; G02B 5/18; G02B 5/28; G02B 5/203; G01J 3/18; G01J 3/1838
See application file for complete search history.

(56) References Cited

U.S. PATENT DOCUMENTS

| | | | |
|---|---|---|---|
| 4,905,014 A | | 2/1990 | Gonzalez et al. |
| 5,268,985 A | * | 12/1993 | Ando ............... G01S 7/4816 359/34 |
| 5,384,573 A | * | 1/1995 | Turpin ............... G01S 7/20 342/179 |
| 5,389,944 A | | 2/1995 | Collinge et al. |
| 5,594,560 A | * | 1/1997 | Jelley ............... G02B 5/32 349/112 |
| 5,684,490 A | | 11/1997 | Young ............... G01S 7/02 342/6 |
| 6,081,235 A | | 6/2000 | Romanofsky et al. |
| 6,473,049 B2 | | 10/2002 | Takeuchi et al. |
| 7,339,551 B2 | * | 3/2008 | Peterson ............... H01Q 3/46 343/755 |
| 7,719,463 B2 | | 5/2010 | Migliaccio et al. |
| 2008/0055170 A1 | * | 3/2008 | Madden, Jr. ......... H01Q 1/1207 343/713 |
| 2010/0033389 A1 | * | 2/2010 | Yonak ............... H01Q 15/08 343/755 |

(Continued)

*Primary Examiner* — Bernarr E Gregory
*Assistant Examiner* — Daniel P Malley, Sr.
(74) *Attorney, Agent, or Firm* — Foley & Lardner LLP

(57) ABSTRACT

A holographic radar reflector includes a surface with a plurality of substantially microwave wavelength scale patterns along one or more portions of the surface. The holographic radar reflector can be a non-specular reflector, where the plurality of substantially microwave wavelength scale patterns have varying reflectivity. The holographic radar reflector can reflect electromagnetic radiation emitted from a fixed feed point in varying directions depending on the portion of the surface reflecting the electromagnetic radiation.

6 Claims, 7 Drawing Sheets

(56) References Cited

U.S. PATENT DOCUMENTS

| | | | | |
|---|---|---|---|---|
| 2010/0265552 A1* | 10/2010 | Wang | ............... | B82Y 20/00 |
| | | | | 359/9 |
| 2010/0303123 A1* | 12/2010 | Li | ............... | G01N 21/62 |
| | | | | 372/98 |
| 2015/0130896 A1* | 5/2015 | Ma | ............... | G02B 5/0252 |
| | | | | 348/40 |
| 2015/0171516 A1* | 6/2015 | Chen | ............... | H01Q 3/00 |
| | | | | 342/368 |

* cited by examiner

WINDSHIELD SMART REFLECTOR SYSTEMS AND METHODS

BACKGROUND

Various types of remote detection, range sensing, and active imaging systems have been or are being developed for use in vehicles, including automobiles. These include radar systems operating at microwave and millimeter or submillimeter wave (Terahertz) frequencies, and infrared optical (LIDAR) systems. These may use traditional scanning techniques or more complex processing techniques such as compressive imaging. However, in many vehicles, the installation of such systems is limited by the vehicle design to certain locations, such as the engine compartment of an automobile; this may limit the aperture size or field of view of these systems.

SUMMARY

One embodiment relates to a holographic electromagnetic radiation reflector. For example, the reflector may be a holographic radar reflector, holographic LIDAR reflector, holographic infrared LIDAR reflector, or other type of holographic reflector. The holographic radar reflector includes a surface including a plurality of substantially wavelength scale patterns along one or more portions of the surface, wherein the holographic radar reflector is non-specular, wherein the plurality of substantially wavelength scale patterns have varying reflectivity at the substantially wavelength scale, and wherein the holographic radar reflector and the plurality of substantially wavelength scale patterns having varying reflectivity are configured to reflect electromagnetic radiation emitted from a fixed feed point in varying non-specular directions depending on the portion of the surface reflecting the electromagnetic radiation.

Another embodiment relates to an optically transparent radar reflector. The radar reflector includes a substrate which is optically transparent and a pattern included in or on the substrate. The pattern is configured to cause at least one of diffractive reflection of a transmitted beam and holographic reflection of a transmitted beam. At least a portion of the incident electromagnetic radiation in a radar band is coherently reflected in a non-specular direction by the optically transparent radar reflector.

Another embodiment relates to an optically transparent transmissive diffractive windshield for a vehicle. The transmissive diffractive windshield includes a substrate which is optically transparent and a pattern included in or on the substrate. The pattern is configured to cause at least one of diffraction of a transmitted beam and holographic diffraction of a transmitted beam. The transmitted beam transmitted from within the cabin of the vehicle and through the windshield.

Another embodiment relates to a radar system including a diffractive reflector and a radar transceiver. The diffractive reflector includes a substrate which is optically transparent and a reflector configured to reflect radar waves. The radar transceiver includes an antenna array, a control circuit coupled to the antenna array, configured to control the antenna array, and further configured to process signals received by the antenna array, and a power source. A pattern of the diffractive reflector is configured to cause diffractive reflection of a transmitted beam from the radar transceiver in one or more directions not coincident with specular reflection from the diffractive reflector. The direction of the reflection of the transmitted beam depends at least in part on a portion of the diffractive reflector illuminated by the transmitted beam from the radar transceiver Another embodiment relates to a method for detecting an object using radar waves. The method includes emitting a transmitted beam using an antenna, reflecting the transmitted beam as an outgoing beam using a reflector, receiving, at the antenna, a return signal reflected by the object, and processing the return signal using a control circuit coupled to the antenna. This can be with a single antenna in a monostatic configuration or two antennas and a bistatic configuration (e.g., one antenna for transmitting and one antenna for receiving).

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
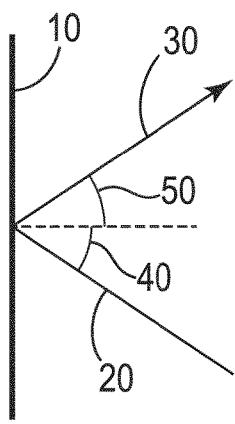
FIG. 1A is a schematic illustration of a specular reflector according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to reflectors and systems and methods for imaging or otherwise sensing an object using electromagnetic radiation. It should be noted that references herein to radar are not limiting and should be understood to include any type of active sensing system based on reflection and/or directional emission of radiation, including radar and LIDAR systems using optical or infrared radiation. These systems can be included in a vehicle and advantageously can use a windshield of the vehicle as a reflector for use in sensing or imaging an object remote from the vehicle.

Generally, vehicles, such as automobiles, can use emitted radar waves to detect and/or measure objects remote from the vehicle. For example, objects can include other vehicles, obstructions such as downed trees, people, animals, and/or other objects which may be in or around the roadway. Older automotive radars operating in centimeter wavelengths (typically 1-10 GHz frequency) generally had little or no angular resolution and were used primarily for short-range distance and relative velocity (range rate) sensing for basic anti-collision systems, or for speed sensing. However, newer radars operating in sub-centimeter wavelengths (typically 30-90 GHz) are capable of useful angular resolution, and in some cases even imaging, allowing much more sophisticated anti-collision systems as well as semiautonomous or autonomous vehicle operation. Systems of the embodiments described herein may use even shorter wavelengths, into the millimeter and sub-millimeter (terahertz) range, as well as infrared LIDAR (optical radar) technology. Radar systems generally have antennas located behind the vehicle front grille. This limits the antenna area, since the front grille area is also used for cooling air intake and is often constrained in size by considerations of drag and vehicle aesthetics. The behind-grille location also gives the radar a poor near-ground viewpoint, easily blocked by other vehicles, and may limit the radar's field of view due to surrounding metal (or metallized plastic) components, including headlights, bumper mounts, decorative grilles, etc. it also leaves the radar exposed to damage even in comparatively minor frontal collisions. Alternative antenna locations, including on top of the vehicle hood and on the vehicle roof, have even more severe problems with drag and vehicle aesthetics.

To address these and/or other shortcomings of existing systems, one or more antennas may be located in, below, or around a hood of a vehicle or otherwise positioned to emit transmitted beams towards a windshield of the vehicle. In some embodiments, the windshield of the vehicle functions as a reflector to produce one or more reflected beams which have one or more far-field patterns directed in front of and/or to the sides the vehicle. The windshield is, functions as, or incorporates a non-specular reflector. The windshield may incorporate patterned structures such that the windshield functions as a no-specular reflector, and in some embodiments, an optical element (e.g., a focusing or diverging lens for a radar beam) may be incorporated in the windshield. In alternative embodiments, the windshield functions as a transmissive optical element which causes a transmitted beam to be diffracted into one or more beams having one or more far-field patterns. In such an embodiment, the antenna providing the transmitted beam may be located within the vehicle.

Referring now to FIG. 1A, specular reflector 10 is illustrated according to one embodiment. Specular reflector 10 reflects transmitted beam 20 as reflected beam 30. Reflected beam 30 has angle of reflection 50 equal to angle of incidence 40 of transmitted beam 20. Specular reflector 10 is unsuited for applications described herein with respect to an imaging system for a vehicle. This is because transmitted beams 20 from around a hood of a vehicle would be reflected steeply upward by a normally-inclined windshield including a specular reflector 10 rather than forward from the vehicle towards the roadway and/or objects on or around the roadway. Therefore, in some embodiments, the vehicle includes a non-specular reflector 100.

Figure 1B:
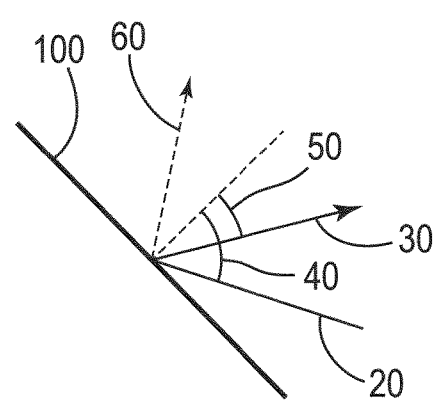
FIG. 1B is a schematic illustration of a non-specular reflector according to one embodiment.

Referring now to FIG. 1B, non-specular reflector 100 is illustrated according to one embodiment. Transmitted beam 20 is reflected by reflector 100 as reflected beam 30. Reflected beam 30 has an angle of reflection 50 which is different than angle of incidence 40 of transmitted beam 20. Advantageously, this allow for reflector 100 to be positioned at an angle and reflect transmitted beams 20 (e.g., coming from below reflector 100) in a direction forward from reflector 100 rather than steeply upward. Compare this to specular reflection in which transmitted beam 20 would be reflected as specular reflected beam 60, steeply upward.

Figure 2A:
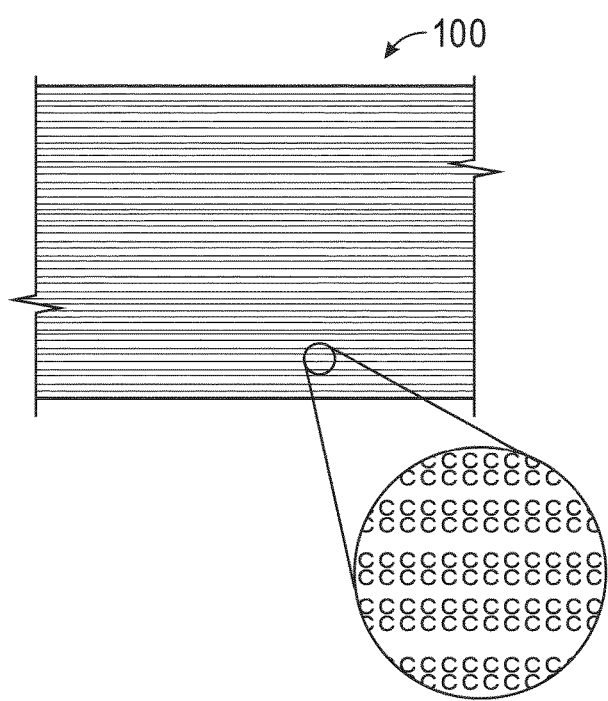
FIG. 2A is a schematic illustration of a non-specular reflector including meta material resonant structures according to one embodiment.

Referring now to FIG. 2A reflector 100 may provide non-specular reflection using one or more techniques. In some embodiments, reflector 100 uses one or more meta-materials in one or more patterned arrangements to provide for non-specular reflection. The use of meta-materials may make the reflector frequency-selective so that different frequencies of electromagnetic radiation are reflected in different patterns and/or directions. In some cases, meta-materials may also provide for a more transparent reflector in comparison to the use of non-meta-materials, as meta-materials take up less area than materials for conventional reflectors. In alternative embodiments, reflector 100 includes conductive wire or nanowire mesh configured to provide for non-specular reflection. The meta-materials and/or conductive wire or nanowire mesh may be arranged in a pattern to provide for non-specular reflection. The patterns of reflector 100 can be formed using a variety of materials and/or techniques. In one embodiment, the patterns are formed using a transparent or semi-transparent conductive material made of subwavelength resonant structures. In some embodiments, the pattern or metamaterial is formed using indium tin oxide. Advantageously, the metamaterial may be transparent to or substantially transparent to visible light allowing for use of reflector 100 as a windshield.

In some embodiments, the pattern is formed using conductive wire or nanowire mesh. The pattern can include opaque materials in some embodiments, but the pattern remains sufficiently small so as to not substantially interfere with vision through reflector. For example, conductive wire and/or nanowire mesh may be opaque but at too small a scale to substantially obscure vision through reflector. The pattern may be sufficiently small such that it is not resolved by normal vision. The pattern may also have sufficiently low density such that it does not substantially dim light passing through reflector 100 and the pattern.

In additional embodiments, the pattern is formed by loading or doping the substrate with microwave responsive material. The microwave responsive material may absorb and reemit, diffract, shield, or otherwise interact with a transmitted beam illuminating reflector 100. In further embodiments, reflector 100 and/or the substrate includes at least two different materials (e.g., a microwave responsive material and a second microwave responsive material with substantially similar optical properties and different microwave properties (e.g., absorption, reflectivity, etc.). The two different materials may be arranged in a variety of ways. For example, the two different materials may be interspersed, formed in groups, deposited as alternating lines etc.

At sufficient magnification, the pattern may appear as noise. For example, reflector 100 may include a plurality of subwavelength resonant structures. The subwavelength resonant structures may be configured to provide for non-specular reflection of transmitted beams which contact reflector 100. As described in more detail herein, various techniques and/or configurations of materials may be used to provide reflector 100 with non-specular reflective properties.

Figure 2B:
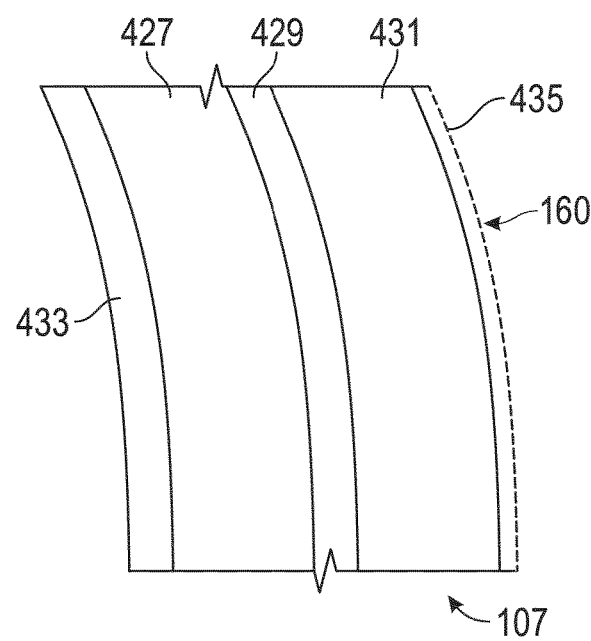
FIG. 2B is a schematic illustration of a reflector including a plurality of layers according to one embodiment.

Referring now to FIG. 2B, a cross-section of a section of reflector 100 having a plurality of layers is illustrated according to an exemplary embodiment. In some embodiments, reflector 100 is included in or on a windshield having multiple layers (e.g., safety glass). In some embodiments, reflector 100 may have multiple layers. For example, reflector 100 may be a two layered microwave reflector having a front layer and a ground plane which may preferentially interact with specific wavelengths. In some embodiments, reflector 100 may be a multilayer optical reflector which reflects a specific wavelength.

In one embodiment, the substrate on or in which the pattern described above is formed has more than one layer. For example, the substrate and/or reflector 100 may have front layer 431, internal layer 429, and back layer 427. In some further embodiments, reflector 100 and/or the substrate includes additional layer 433.

In one embodiment, the pattern is formed on or in the front surface of a multilayer material used as the substrate. For example, the pattern may be included as layer 435. The pattern may be formed on front layer 431. Alternatively, the pattern may be contained within front layer 431. In some embodiments, front layer 431 is glass and is part of windshield 107 which includes at least a glass front layer 431, a plastic internal layer 429, and a glass back layer 427. In alternative embodiments, one or more of the layers of the multilayer substrate may be made of or include other substrate materials such as those previously described herein.

In other embodiments, the pattern is formed on or in a back surface of a multilayer material used as the substrate. The pattern may be formed on back layer 427. Alternatively, the pattern may be contained within back layer 427. In some embodiments, back layer 433 is glass and is part of windshield 107 which includes at least a glass front layer 431, a plastic internal layer 429, and a glass back layer 427. In alternative embodiments, one or more of the layers of the multilayer substrate may be made of or include other substrate materials such as those previously described herein.

In further embodiments, the pattern is formed on or in an internal surface of a multilayer material used as the substrate. The pattern may be formed on internal layer 429. Alternatively, the pattern may be contained within internal layer 429. In some embodiments, internal layer 429 is plastic and is part of windshield 107 which includes at least a glass front layer 431, a plastic internal layer 429, and a glass back layer 427. In alternative embodiments, one or more of the layers of the multilayer substrate may be made of or include other substrate materials such as those previously described herein.

In still further embodiments, the pattern of reflector 100 can be included in a plurality of layers. The pattern can be formed on two or more surfaces of a multilayer material used as the substrate. As previously described, patterns may overlap and be located on separate layers. This may increase the number or type of reflected beam patterns and/or the number or type of different beam characteristics which may be produced by reflector 100. Additionally, the substrate and/or reflector 100 can include more or fewer than three layers.

In some embodiments, the substrate and/or reflector 100 includes additional layer 433. Additional layer 433 can be an absorbing layer configured to absorb all or a substantial portion of the transmitted beam which is not reflected by the pattern. In alternative embodiments, additional layer 433 is a specularly reflecting layer. The additional layer can be located behind a layer including the pattern. For example, additional layer 433 can be included in the substrate. Continuing the example, the absorbing layer can be included in a vehicle windshield. Advantageously, additional layer 433 can absorb all or substantially all radar waves not reflected by reflector 100, thereby preventing the radar waves from entering the cabin of vehicle 101. In an alternative embodiment, additional layer 433 is or includes a reflective layer configured to reflect all or a substantial portion of the transmitted beam which is not reflected by the pattern.

Figure 3:
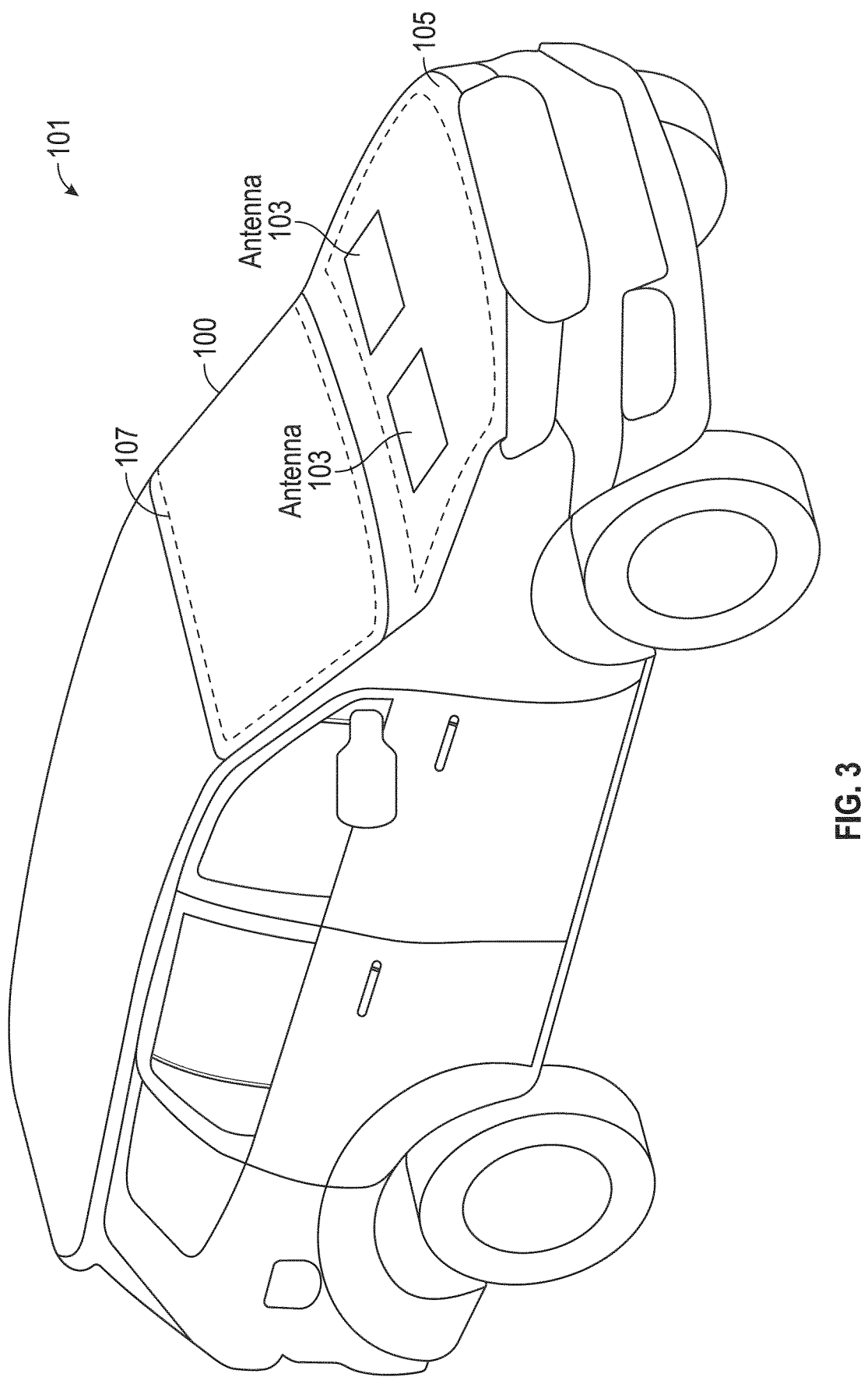
FIG. 3 is a schematic illustration of a vehicle having a reflector and antennas according to one embodiment.

Referring now to FIG. 3, reflector 100 is shown as incorporated in windshield 107 of vehicle 101. Also shown incorporated into vehicle 101 are antennas 103 which can be located underneath or in hood 105. One or more antennas 103 can emit and/or receive electromagnetic radiation in one or more beams for use in imaging objects remote from vehicle 101. Except where specifically noted (e.g., in connection with amplitude-dependent reflection) any configuration described herein which can transmit RF energy from an antenna into a particular far-field angular distribution can also be used to receive energy into the same antenna at the same frequency, and with the same far-field gain distribution. The electromagnetic radiation emitted by one or more antennas 103 can be emitted such that the electromagnetic radiation is reflected by reflector 100 to form one or more forward or side projecting beams for use in object detection.

In some embodiments, vehicle 101 is an automobile. For example, vehicle 101 may be a car, truck, crossover, or other road going vehicle. Vehicle 101 can also be a motorcycle or other road going vehicle having windshield 107. In further embodiments, vehicle 101 is an aircraft or other airborne vehicle. For example, vehicle 101 may be an airplane, helicopter, spacecraft, ultralight, or other vehicle including windshield 107. In still further embodiments, vehicle 101 is a watercraft. For example, vehicle 101 can be a boat, submersible, personal watercraft, or other watercraft having windshield 107 or other translucent or transparent surface.

In some embodiments, windshield 107 or another surface (e.g., a window) forms a substrate for reflector 100. Reflector 100 can operate as a holographic reflector and/or as a diffractive reflector (e.g., depending on the application in which the optically transparent radar reflector, reflector 100, is used). Holographic reflectors may operate by diffraction of incident radiation. As used herein, a diffractive reflector is one which transforms a single incident beam primarily into a single reflected (or transmitted) beam, with at most a change in divergence on one or two axes. A holographic reflector is one which transforms a single incident beam into a more complex far-field distribution of energy, including multiple beams or pseudo-random illumination. As a holographic reflector, reflector 100 can manipulate a transmitted beam (e.g., a beam of radar waves from antenna 103) to generate a beam which is reflected from reflector 100 having desired properties. Properties which can be manipulated by reflector 100 include, the direction, polarization, phase, amplitude, beam pattern, and/or other properties of electromagnetic radiation. As described in more detail herein, reflector 100 may manipulate these properties using a combination of metamaterials, patterns of reflective materials, a plurality of materials with varying electromagnetic properties, and/or other materials and techniques. Reflector 100 as a holographic reflector can perform transformations on transmitted beams. These transformations may be useful for compressive sensing techniques used for detecting objects remote from vehicle 101.

As a diffractive reflector, reflector 101 can use diffraction and/or other techniques to manipulate a transmitted beam from antenna 103. The transmitted beam can be manipulated to create beams which are directed to one or the other sides of vehicle 101, in front of vehicle 101, or otherwise manipulated. As described in more detail herein, reflector 100 may manipulate the reflection of a transmitted beam using a combination of metamaterials, a plurality of materials with varying electromagnetic properties, and/or other materials and techniques. A transmitted beam can be diffracted by reflector 100 to produce beams which have a specific beam pattern.

Still referring to FIG. 3, reflector 100 can be incorporated into windshield 107 of vehicle 101. Advantageously, this utilizes an existing component of vehicle 101 for use as part of reflector 100. Windshield 107 can form an optically transparent substrate of reflector 100. Reflector 100 can be incorporated into or created on one or more surfaces of windshield 107 as described herein in more detail with reference to FIGS. 6A-C. The other components or materials of reflector 100 can be substantially transparent or sufficiently small so as to not substantially interfere with vision through reflector 100. Therefore, reflector 100 can be included in or on windshield 107 without obstructing visibility from within vehicle 101. In some embodiments, the pattern included in reflector 100 to provide non-specular reflection may be visible, but may be sufficiently small and/or transparent so that it cannot be resolved by normal vision. In some embodiments, the pattern may be constructed to include non-functional components (e.g., breaks in wires, detuned subwavelength resonant structures, etc.) which makes for a solid unbroken appearance rather than visible patterns. In some embodiments, the patterns and/or materials making up the patterns may be randomized to prevent unintended obstruction of the optical band and/or diffraction of visible light. This may assist in preventing a vehicle occupant from resolving the pattern.

One or more antennas 103 may be used to generate and emit electromagnetic radiation in the form of a transmitted beam. In some embodiments, the electromagnetic radiation emitted by antennas 103 is in one or more radar spectra. In alternative embodiments, other spectra are used. For example, the electromagnetic radiation emitted by antennas 103 can be in the infrared and/or other spectra. As discussed throughout, radar waves can be substituted for electromagnetic radiation of other spectra in alternative embodiments of the systems and methods described. The transmitted beam can be directed towards reflector 100 or a portion thereof. Illuminating a specific portion of reflector 100 can allow a transceiver system to produce a reflected beam with specific characteristics for use in imaging an object remote from vehicle 101. In some embodiments, antenna 103 is also used to receive radar waves reflected from the object (e.g., return signals) as a result of the object being illuminated by the reflected beam (e.g., the transmitted beam as reflected by reflector 100). In embodiments in which a single antenna is used to transmit and receive radar electromagnetic radiation, the received return signals are reflected by reflector 100 prior to being received by antenna 103. In alternative embodiments, a plurality of antennas 103 can be used for emitting, receiving, or both emitting and receiving radar waves. In some embodiments, a separate receiving antenna 103 may receive return signals which are reflected by reflector 100 prior to being received.

Figure 4:
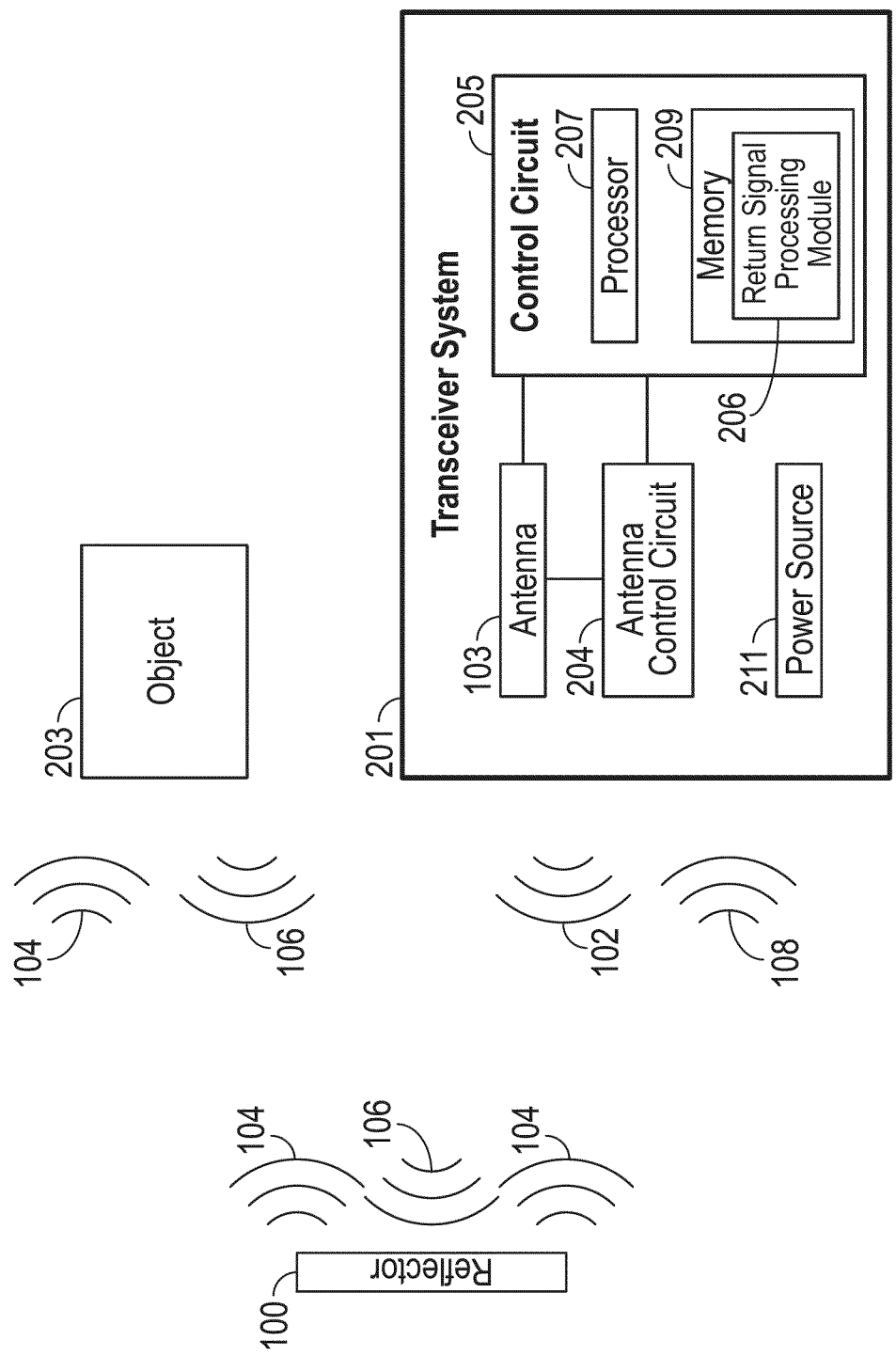
FIG. 4 is a block diagram illustrating components of a transceiver system for measuring an object using a reflector according to one embodiment.

Referring now to FIG. 4, in one embodiment, vehicle 101 includes transceiver system 201. Transceiver system 201 includes antenna 103, control circuit 205, processor 207, memory 209, and power source 211. Transceiver system 201 uses these and/or other components to control antenna 103 for use with reflector 100 to illuminate object 203 and/or process radar waves reflected by object 203.

In one embodiment, antenna 103 is an array of antennas or otherwise includes a plurality of antennas 103. Antennas 103 can be controlled by control circuit 205. Using techniques such as actively phasing a plurality of antennas 103, control circuit 205 can direct a scanned transmitted beam towards a portion of reflector 100. By controlling the phasing of antennas 103, control circuit 205 can cause a wavefront or beam with a specific beam pattern to illuminate a specific portion of reflector 100. Antenna 103 may illuminate the entire transparent reflector area at once, or may selectively produce two or more beams that each illuminate only a portion of the reflector area. Antenna 103 may also produce one or more steerable beams (i.e., antenna 103 may be a 1-D or 2-D phased array antenna, a mechanically steerable antenna, etc.).

In alternative embodiments, antenna 103 is or includes a plurality of fixed antennas 103. Each of the plurality of antennas 103 can generate a fixed transmitted beam which illuminates a specific portion of reflector 100. Control circuit 205 can emit a transmitted beam using a specific antenna 103 to illuminate the corresponding portion of reflector 100. This causes a specific reflected beam to be created with specific characteristics such as beam pattern or direction. For example, a first antenna 103 can be used to generate a transmitted beam which illuminates a specific portion of reflector 100 causing the transmitted beam to be reflected as a side looking radar beam. Continuing the example, a second antenna 103 can be used to generate a transmitted beam which illuminates a different specific portion of reflector 100 causing the transmitted beam to be reflected as a forward looking radar beam. An array of antennas 103 can generate a plurality of transmitted beams with each transmitted beam directed toward a different portion of reflector 100.

Additionally, control circuit 205 can cause the simultaneous emission of radar waves from two or more of antennas 103 to generate a plurality of different beam patterns of the transmitted beam using different antennas 103. Each beam pattern can be directed toward a different portion of reflector 100. Additionally, a plurality of transmitted beams generated simultaneously or substantially simultaneously by antennas 103 and/or control circuit 205 can illuminate a plurality of specific portions of reflector 100.

In addition to emitting one or more transmitted beams, antennas 103 can be used to receive radar waves which are reflected from object 203. In some embodiments, the transmitted beam from antennas 103 is reflected first by reflector 100 as a first reflected beam. The first reflected beam (e.g., the transmitted beam as reflected by reflector 100) then illuminates object 203. Object 203 then reflects the first reflected beam as a second reflected beam (e.g., radar waves from the first reflected beam which reflect from object 203). Antennas 103 receive the second reflected beam (e.g., the radar waves reflected from object 203). In some embodiments, the second reflected beam (e.g., the radar waves reflected by object 203) is reflected again by reflector 100 prior to being received by antennas 103.

In some embodiments, antenna 103 both emits and receives radar waves. Antennas 103 and/or control circuit 205 may use duplexing techniques to emit and receive radar waves with the same antennas 103. In further embodiments, duplexing techniques are used to increase the number of radar waves that may be generated and received. Antennas 103 can produce radar waves (e.g., transmitted beams) having high power (e.g., high amplitude) or lower power (e.g., lower amplitude). Reflector 100 can be amplitude dependent such that high power radar waves are reflected in a first direction and lower power radar waves are reflected in a second direction. This can provide for duplexing based on the amplitude dependency. In alternative embodiments, antennas 103 include a plurality of antennas with one or more antennas dedicated to emitting radar waves and other antennas dedicated to receiving radar waves.

In one embodiment, radar waves received by antennas 103 are processed by control circuit 205. Control circuit 205 includes processor 207 and memory 209. These components can be used to process received radar waves and perform the control functions related to antennas 103 described herein. Additionally, control circuit 205 can control reflector 100. For example, reflector 100 may be switchable or controllable using a voltage, temperature, magnetic field, or electric field which is applied or controlled by control circuit 205. A pattern included in reflector 100 may be made of controllable meta-materials which are controlled by control circuit 205. For example, control circuit 205 may turn meta-materials on or off, shift a frequency to which the meta-materials respond, shift a frequency of a frequency resonant structure, etc.

Processor 207 may be implemented as a general-purpose processor, an application specific integrated circuit (ASIC), one or more field programmable gate arrays (FPGAs), a digital-signal-processor (DSP), a group of processing components, or other suitable electronic processing components. Memory 209 is one or more devices (e.g., RAM, ROM, Flash Memory, hard disk storage, etc.) for storing data and/or computer code for facilitating the various processes described herein. Memory 209 may be or include non-transient volatile memory or non-volatile memory. Memory 209 may include database components, object code components, script components, or any other type of information structure for supporting the various activities and information structures described herein. Memory 209 may be communicably connected to processor 207 and provide computer code or instructions to processor 207 for executing the processes described herein. Memory 209 can include one or more modules for facilitating the functions described herein.

Control circuit 205 may process radar waves according to a program or module stored in memory 209. Control circuit 205 may perform a variety of functions according to one or more modules such as imaging an object using radar techniques, determining the distance object 203 is from vehicle 101 using radar techniques (e.g., using the time from emission of radar waves to reception of radar waves), determining the speed and/or trajectory of object 101 using radar techniques (e.g., using the Doppler effect), creating an image of object 203, and/or otherwise providing information about objects 203 remote from vehicle 101.

In further embodiments, control circuit 205 can use compressive sensing techniques to image or otherwise determine information about object 203. For example, control circuit 205 can cause radar waves to be emitted from antennas 103 which, in conjunction with reflector 100, create a plurality of reflected beams with arbitrary beam patterns. Some of the plurality of beams may be reflected by object 203 and received and processed. Control circuit 205 may repeat the emission of radar waves by controlling antennas 103 and/or the characteristics of the emitted transmitted beams (e.g., the frequency, amplitude, or beam pattern or direction) such that reflector 100 produces a different plurality of beams with arbitrary beam patterns. Some of these beams may be reflected by object 203 and received and processed. Using compressive sensing algorithms, control circuit 205 can determine information about object 203 and or create an image of object 203. Advantageously, the use of reflector 100 to produce arbitrary beam patterns may increase the effectiveness of the compressive sensing techniques as the returns from object 203 or lack of returns may be more random or pseudorandom (e.g., the sensing matrix used in the compressive imaging techniques may be more likely to approximate or have the restricted isometric property desirable for use in compressive imaging). With the use of random or pseudorandom reflected radar waves from reflector 100, non-sparse areas in the surroundings of vehicle 101 being measured are less likely to be missed, thus increasing the effectiveness of compressive sensing techniques. Compressive sensing techniques may reduce the size of an image file created without the use of compression algorithms. Compressive imaging techniques may further decrease power consumption as compression is not performed. Lastly, fewer transmitted beams may be used to image object 203 thus decreasing the time used in sensing object 203 (e.g., in comparison to the use of a raster or scanning based technique). Advantageously, this may improve safety features of vehicle 100 such as collision avoidance as objects 203 can be sensed with greater speed allowing for faster reaction times and/or more time for processing using collision avoidance programs or algorithms. Compressive imaging may also simplify transmissions from an under-hood antenna as a simple input into reflector 100 may provide a complex far field pattern of radiation for use in imaging a scene.

In some embodiments, antenna control circuit 204 controls the operation of antenna 103 as described herein. For example, antenna control circuit 204 may control the emission of electromagnetic radiation, the scanning of antenna 103, and/or otherwise control antenna 103. In some embodiments, antenna control circuit 204 responds to or is otherwise configured to control antenna 103 in response to input from control circuit 205.

In some embodiments, control circuit 207 includes return signal processing module 206 in memory 209. Return signal processing module 206 may include functions, algorithms, programs, and/or other information for processing return signals to generate information regarding a scene as described herein. Return signal processing module may further provide instructions to antenna control circuit 204 for controlling antenna 103 (e.g., instructions to emit electromagnetic radiation in a particular direction to better image a particular area of a scene).

Memory 209, processor 207, and/or other components of control circuit 205 may facilitate these and/or other functions described herein using one or more programming techniques, data manipulation techniques, and/or processing techniques such as using algorithms, routines, lookup tables, arrays, searching, databases, comparisons, instructions, etc.

Still referring to FIG. 4, in one embodiment, antennas 103 are a phased array controlled by control circuit 205 as previously discussed. Alternatively, antennas 103 can include one or more of dipole antennas, loop antennas, plate antennas, metamaterial antennas, and/or other types of antennas. As described with reference to FIG. 5A herein, antennas 103 can be placed in one or more locations in or on vehicle 100.

Power source 211 provides power to transceiver system 201. Power source 211 can also provide power for use in controlling reflector 100. For example, power source 211 can provide a voltage to reflector 100 in response to switching from control circuit 205. In some embodiments, power source 211 is a power system of vehicle 101.

Object 203 can be any body remote from vehicle 100. Some examples of object 203 include other vehicles, pedestrians, animals, trees, buildings, roadways, etc. A plurality of objects 203 can be imaged, measured, characterized, or otherwise processed simultaneously or substantially simultaneously using the techniques described herein. Thus, the surroundings or a portion of the surroundings of vehicle 101 can be sensed.

Still referring to FIG. 4, in one embodiment, transceiver system 201 emits transmitted beam 102 using a single antenna 103. Transmitted beam 102 is reflected by reflector 100 and reflected beam 104 has a far-field pattern determined by one or more of the area of reflector 100 illuminated by transmitted beam 102 and/or the characteristics of the meta material pattern included therein, the frequency of transmitted beam 102, the amplitude of transmitted beam 102, and/or other characteristics of transmitted beam 102 and/or reflector 100. Reflected beam 104 is reflected by object 203 as return signal 106. Return signal 106 is reflected by reflector 100 and reflected return signal 108 is received by antenna 103 (e.g., a monostatic configuration). Alternative configurations are possible as described herein. A bistatic configuration with different antenna(s) 103 for transmitting and receiving may be used. Return signal 106 may be received by an antenna 103 prior to being reflected by reflector 100. Transmitted beam 102 may be transmitted through reflector 100 with reflector 100 provides transmissive diffraction rather than reflection. Reflector 100 may be configured to produce a plurality of reflected far-field beams 104 having a far-field beam pattern or including multiple far-field beams.

In some embodiments, transceiver system 201 is configured to illuminate a scene including multiple objects 203 using reflector 100. Advantageously, this allows transceiver system 201 to detect and/or image multiple objects 203. For example, transceiver system 201 may be used in conjunction with a vehicle anti-collision system in which the scene imaged/measured is a roadway including multiple objects 203 (e.g., vehicles, a roadway, obstructions, guard rails, lanes, etc.).

Figure 5A:
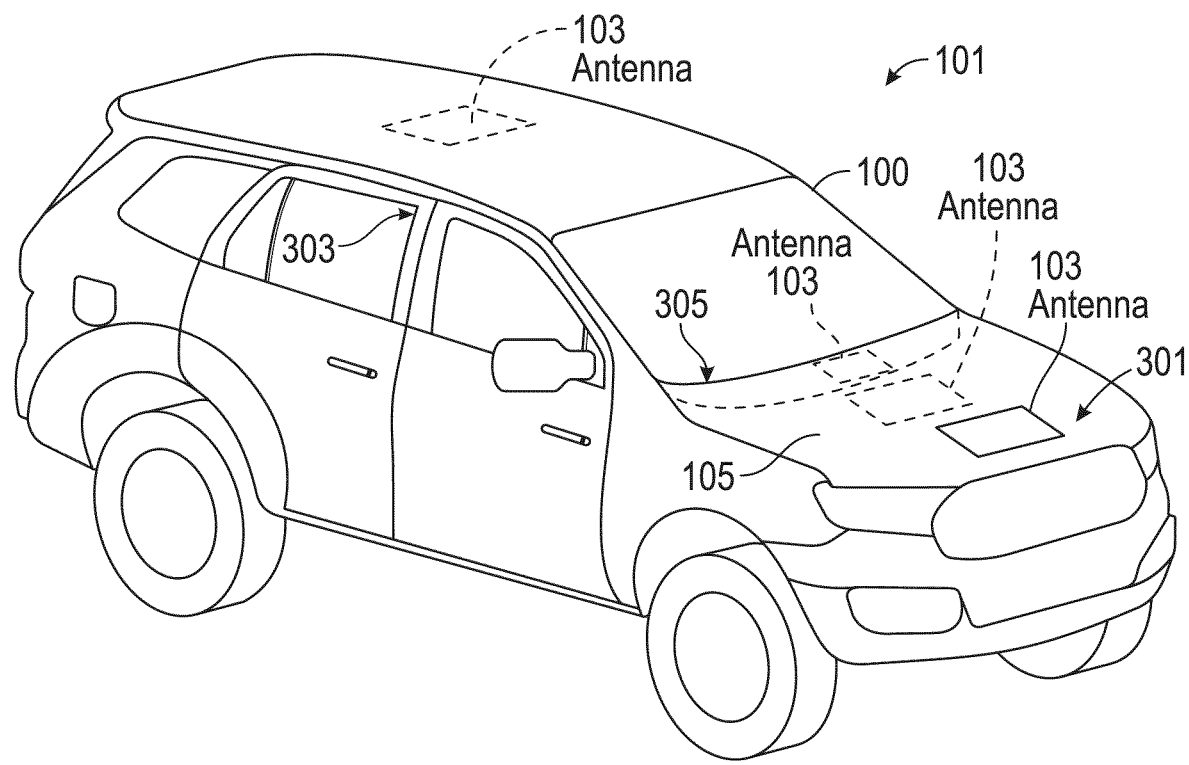
FIG. 5A is a schematic illustration of a vehicle showing the location of antennas according to one embodiment.

Referring now to FIG. 5A, vehicle 101 is illustrated along with multiple possible locations of antennas 103 according to one embodiment. In one embodiment, antenna 103 is mounted underneath hood 105 of vehicle 101. For example, antenna 103 may be mounted to the underside of hood 105. Alternatively, antenna 103 may be mounted on a supporting structure such that antenna 103 is located beneath hood 105. In some embodiments, hood 105 does not substantially absorb or reflect radar waves. For example, hood 105 may be made partially or entirely of carbon fiber, plastic, fiberglass, or another material which can be penetrated with radar waves without substantial absorption or deflection.

In other embodiments, antenna 103 can be mounted on hood 105. Advantageously, this allows hood 105 to be constructed of a material which may be substantially radar reflective or radar absorbing. For example, hood 105 may be made entirely or in part of steel, aluminum, or another metal. Antenna 103 can be mounted in a decorative feature of hood 105. For example, antenna 103 can be mounted in or on a decorative hood scoop, hood ornament, or other decorative feature.

In further embodiments, antenna 103 is mounted on cowl panel 305 located in front of windshield 107 of vehicle 101. For example, cowl panel 305 may be a panel which includes vents for cold air intake, mounts for windshield wipers, and/or other equipment located in front of windshield 107 but not on hood 105 of vehicle 101.

In still further embodiments, antennas 103 are mounted in the cabin of vehicle 101. Antennas 103 mounted in the cabin of vehicle 101 can be configured to direct a transmitted beam towards windshield 107. Windshield 107 may be transmissive and can operate as a transmissive optical element, as described later herein, to direct or otherwise modify the transmitted beam as it passes through windshield 107 and reflector 100. Windshield 107 may operate as a lens, prism, hologram, or combination of these.

Figure 5B:
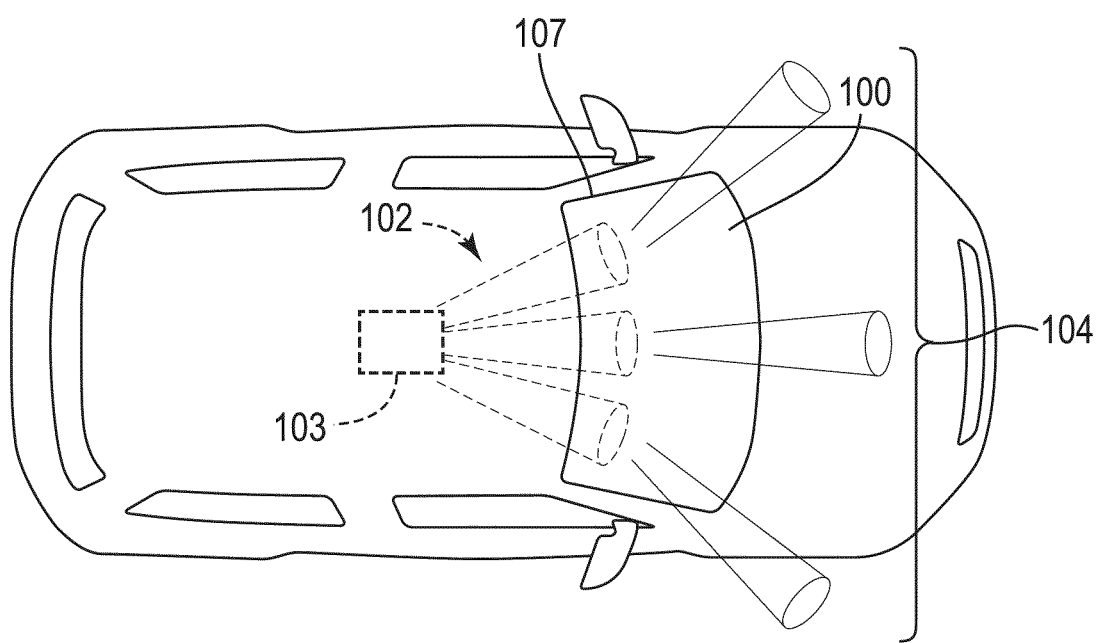
FIG. 5B is a schematic illustration of a vehicle including a transmissive diffractive windshield according to one embodiment.

Referring now to FIG. 5B, in some embodiments reflector 100 does not reflect but is rather transmissive and diffracts transmitted beams 102 which pass through windshield 107. Windshield 107 may include meta materials, subwavelength resonant structures, conductive materials (e.g., conductive wire or nanowire mesh) and/or otherwise be configured to diffract transmitted beam 102 into a plurality of far-field beams 104. Far-field beams may have a pattern or direction which is dependent on one or more characteristics of transmitted beam 102 such as frequency, phase, amplitude, the location at which transmitted beam 102 contacts windshield 107, and/or other characteristics. Far-field beams 104 may be reflected by one or more objects with the return signal received by antenna 103 (e.g., in a monostatic configuration) or by an additional antenna 103 (e.g., in a bistatic configuration). The return signal may pass through windshield 107 prior to being received by antenna 103 and undergo holographic transformation prior to being received (e.g., the transmit path and the return path may be the same). Reflector 100 and/or windshield 107 may be used in a transmissive diffraction configuration to perform one or more of the functions described herein with respect to reflector 100 in a reflection/holographic reflection configuration. The techniques used for holographic reflection may be adapted and/or used for holographic transmission. A transmitted beam 102 may pass through windshield 107 and be directed at a wider angle such that the corresponding far-filed beam 104 illuminates a scene at a wider angle. Windshield 107 may also produce varying far-field patterns depending on the portion of windshield 107 illuminated by transmitted beam 102.

Figure 6A:
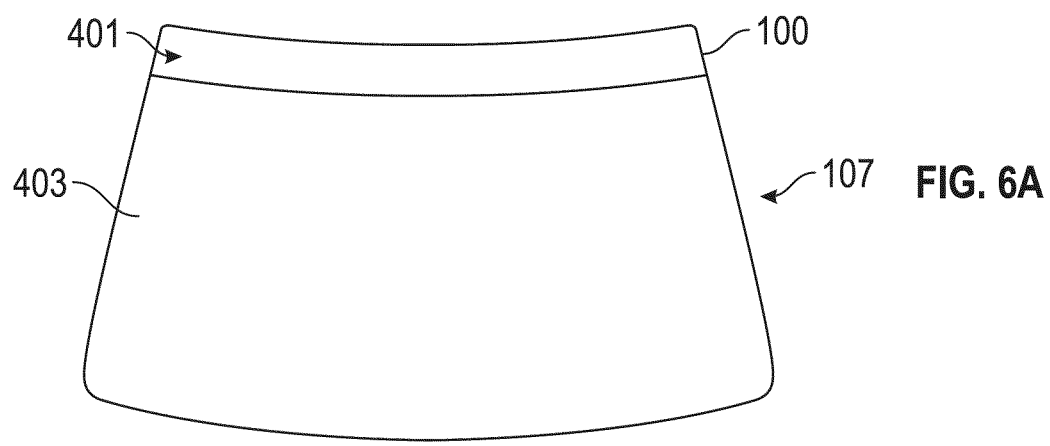
FIG. 6A is a schematic illustration of a reflector included in an upper portion of a vehicle windshield according to one embodiment.
Figure 6B:
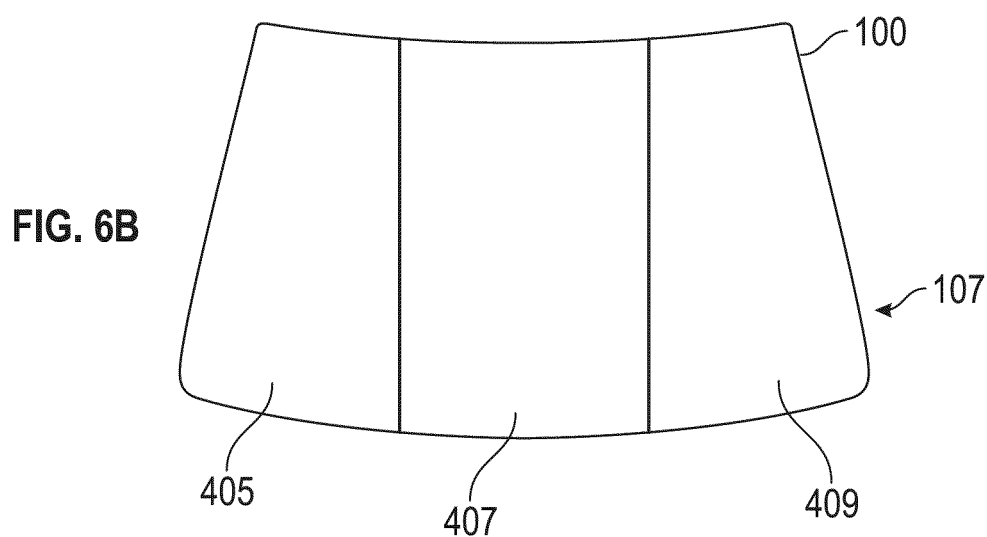
FIG. 6B is a schematic illustration of a reflector included in a vehicle windshield and segmented into sections according to one embodiment.
Figure 6C:
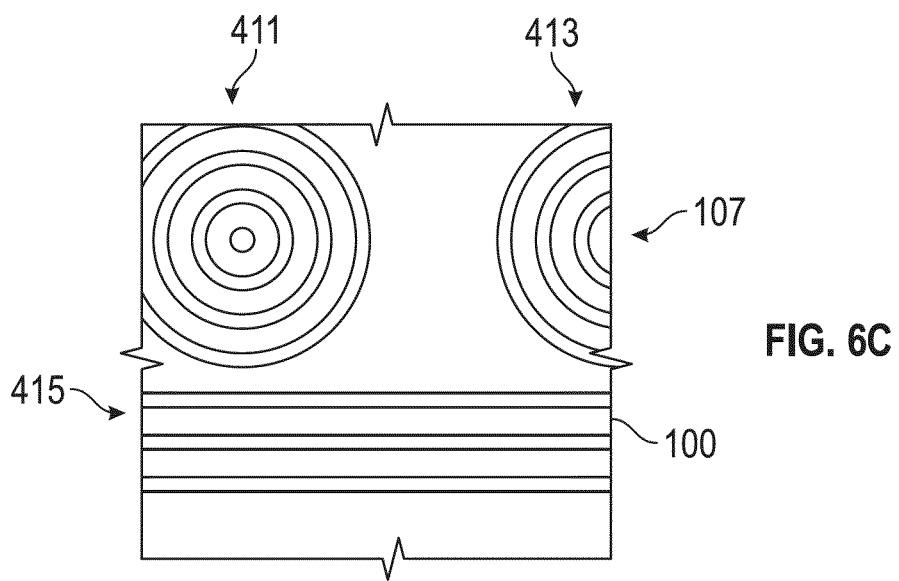
FIG. 6C is a schematic illustration of a section of a reflector including a plurality of patterns according to one embodiment.

Referring generally to FIGS. 6A-6C, reflector 100 can be located in or on windshield 107 of vehicle 101. Reflector 100 can operate as a space-fed holographic reflector which generates a variety of beams in response to varying transmitted beams from antennas 103. Similarly, reflector 100 can operate as a diffractive reflector to produce a variety of beams in response to varying transmitted beams from antennas 103. Transmitted beams can vary based on amplitude, phase, frequency, beam pattern and/or location (e.g., the portion of reflector 100 illuminated by the transmitted beam). For example, metamaterials, patterns of conductive materials, doping of materials with differing microwave properties, dielectrics, polarization, and/or other materials and techniques can be used to produce beams with reflector 100.

In some embodiments, two or more feed points (e.g., illuminating two or more portions of reflector 100 with antennas 103) are used to produce additional alternative beams using reflector 100. In additional embodiments, the frequency of the transmitted beam is controlled to select among different beam patterns produced by reflector 100. While slightly changing the frequency of an input beam will change the beam produced by a given pattern slightly (because it changes the angle of diffraction) selecting different beam patterns by changing frequency requires that the reflector 100 have frequency-selective elements such as subwavelength resonators (e.g., metamaterials). For large frequency changes this selectivity may not require strong resonances (e.g., simple wires which are one quarter wavelength sized at one frequency and significantly less than one quarter wavelength sized at a much lower frequency). For small frequency changes, frequency selectivity requires resonance, which may be provided by subwavelength (i.e. metamaterial) resonators. Techniques similar to those used in holographic antennas can be used. In further embodiments, reflector 100 can, in whole or in part, be polarized. Polarization can be used (e.g., illuminating polarized and non-polarized portions of reflector 100) to produce additional beams with varying characteristics.

In some embodiments, reflector 100 includes one or more metamaterials as described herein. Metamaterials may be or include any material engineered to have properties not found in nature. Metamaterials can be repeating structures of subwavelength scale constructed of materials such as metals or plastics. Metamaterial structures can be two dimensional or three dimensional. In some embodiments, metamaterials are linear, frequency dependent structures. This may cause reflector 100 to produce a reflected beam, in response to a transmitted beam, which has characteristics dependent upon the frequency of the transmitted beam which illuminates reflector 100. The frequency dependent diffractive properties of a reflected transmitted beam may be independent for transmitted beams of different frequencies or frequency ranges. In additional embodiments, the metamaterial structures may have amplitude dependent properties by, for example, including non-linear elements such as diodes, varactors, or varistors, such that they interact differently with high amplitude (transmitted) signals and low-amplitude (received) signals. The metamaterial structures of reflector 100 can shift either the amplitude or the phase of a reflected beam depending on the structure or type of metamaterial incorporated in reflector 100. Metamaterials may be used to give reflector 100 the properties described herein.

As an example, metamaterials may include structures which are subwavelength resonant structures. In some embodiments, the metamaterial structures are constructed at least partially of indium tin oxide and/or other optically-transparent conductors. Advantageously, the use of indium tin oxide may result in structures which are optically transparent or translucent. Thus, reflector 100 may not affect, substantially or at all, the visibility through windshield 107 used as the substrate for reflector 100.

Referring now to FIG. 6A, reflector 100 is included in or on only a first portion 401 of windshield 107 of vehicle 101 in some embodiments. In one embodiment, first portion 401 includes reflector 100 and is the upper portion (e.g., the upper eighth) of windshield 107. Remaining portion 403 (e.g., the lower seven eighths) of windshield 107 does not include reflector 100. Advantageously, this can increase the safety of passengers in vehicle 101 as any radar waves which leak through reflector 100 may pass above the passengers. Additionally, using only first portion 401 of windshield 107 for reflector 100 may increase visibility through windshield 107. As discussed herein, reflector 100 is not completely or substantially transparent in some embodiments. Therefore, restricting reflector 100 to first portion 401 can provide remaining portion 403 as a transparent or nearly transparent windshield for use by operators of vehicle 101. Antennas 103 may be configured to produce beams which only or substantially only illuminate first portion 401. Remaining portion 403 may remain unilluminated or substantially unilluminated by radar waves from antennas 103.

Referring now to FIG. 6B, reflector 100 is segmented in some embodiments. Each segment of reflector 100 can contain a pattern of metamaterials or other beam altering materials as described in greater detail with reference to FIG. 6C. Reflector 100 can be segmented into relatively few portions in one embodiment. For example, reflector 100 can include first region 405 with a first substantially wavelength scale pattern, second region 407 with a second substantially wavelength scale pattern, and third region 409 with a third substantially wavelength scale pattern. The wavelength scale pattern can correspond to any wavelength. For example, the wavelength scale pattern may be on the same scale or order of magnitude as any spectra of electromagnetic radiation having a wavelength greater than that of visible light (e.g., infra-red wavelengths, microwave wavelengths, radar wavelengths, etc.). The direction of a beam reflected by reflector 100 in response to illumination by a transmitted beam can depend on the whether first region 405, second region 407, or third region 409 is illuminated by the transmitted beam. In one embodiment, first region 405 reflects beams outward to one side of the reflector 100, second region 407 reflects beams forward from the reflector 100, and third region 409 reflects beams outward to the other side of reflector 100.

The relatively few number of segments may result in large differences between reflected beams depending on which portion of reflector 100 is illuminated by the transmitted beam from antennas 103. In other words, a small change in the portion of the surface of reflector 100 illuminated by a transmitted beam can result in a large change in the pattern or patterns (e.g., beam shape or profile) of a reflected beam or beams. Other numbers of segments and configurations of segments (e.g., the direction in which the transmitted beam is reflected, how the phase of the transmitted beam is altered, how the frequency of the transmitted beam is altered, how the amplitude of the transmitted beam is altered, etc. for each segment) may differ in other embodiments.

In some embodiments, reflector 100 is segmented into relatively many portions. A plurality of substantially wavelength scale patterns, each pattern being a segment, of reflector 100 can be substantially continuous. In other words, a small change in the portion of the surface of the reflector 100 illuminated by a transmitted beam results in a small change in the pattern or patterns of a reflected beam or beams.

Referring now to FIG. 6C, a portion of reflector 100 having different patterns is illustrated according to one embodiment. In some embodiments, the patterns are substantially wavelength scale patterns. The patterns may be used to alter one or more characteristic (e.g., frequency, phase, amplitude, direction, beam pattern, etc.) of a transmitted beam which is reflected by reflector 100. The pattern can be configured to diffract and/or reflect a transmitted beam. The pattern can also be configured to cause holographic reflection of the transmitted beam.

In some embodiments, the patterns of reflector 100 are formed on a substrate. The substrate may be optically transparent. For example, the substrate may be or include one or more of glass, plastic, chemical vapor deposition diamond, and silicon. In some embodiments, the substrate is planar or curvilinear. The type of patterns included on or in the substrate and/or the characteristics of the transmitted beam emitted by antennas 103 can compensate for the curvilinear characteristics of the substrate. This allows a transmitted beam to be reflected in a specific direction (e.g., forward and down) despite the substrate and reflector 100 being angled away from antenna 103 and/or the beam emitted therefrom (e.g., as in the case of reflector 100 being used as windshield 107 of vehicle 101). As such, the substrate and reflector 100 can be or be included in windshield 107 of vehicle 101.

In some embodiments, all patterns are on or in the same layer of reflector 100. In alternative embodiments, reflector 100 includes a plurality of layers, and patterns can be on one or more layers. Patterns can be overlapping but on separate layers. This may allow one portion or specific location of reflector 100 to respond differently depending on the frequency of the transmitted beam illuminating that portion or specific location of reflector 100 (e.g., the overlapping patterns may have different geometries with each geometry responding to a different frequency). This different response may be produced by having each pattern of the overlapping patterns be comprised of subwavelength resonant elements (i.e., metamaterial resonators) having a common resonant frequency different from the resonant frequencies of resonators making up other patterns. Different overlapping patterns may also respond to different polarizations of radiation (e.g., vertical vs. horizontal or left-circular vs. right-circular), in addition to or instead of responding to different frequencies. In still further embodiments, patterns are included in a single layer but are interlaced with one another.

Referring again to FIGS. 6A-6C generally, reflector 100 can be a phase hologram reflector. Reflector 100 can shift the phase of a reflected beam using physical displacement of the beam. For example, reflector 100 can be or include a dielectric sheet. The front and back of the dielectric sheet may be coated to produce the phase shift. The dielectric sheet may be or include layers of a multilayer substrate (e.g., as illustrated in FIG. 2B). In additional embodiments, reflector 100 is an amplitude hologram reflector. Reflector 100 can function as a holographic reflector based on at least one of binary, multi-level, or continuous differences in a phase or an amplitude of a transmitted beam being reflected. Reflector 100 as a phase hologram reflector can also shift the phase of a beam being reflected for beams having a plurality of different wavelengths. In other words, reflector 100 in combination with antenna 103 may have a multi-wavelength phase range. This may approximate a Fresnel reflector.

Reflector 100 (e.g., as a diffractive reflector) can be switched or controlled by control circuit 205. For example, the substrate and/or reflector 100 can include a dielectric or polarizing components. These components can be controlled by providing the substrate and/or reflector 100 with a voltage, temperature, electric field, or magnetic field. Control circuit 205 may control a voltage delivery system, heater, or cooler which affects the substrate and/or reflector 100. The change in voltage, temperature, the electric field, or the magnetic field can cause the charge of the dielectric sheet to orient and/or the polarization of the substrate or reflector 100 to change. Thus, control circuit 205 can control or switch one or more characteristics of reflector 100 and/or the substrate, which affect the beams reflected.

Figure 7A:
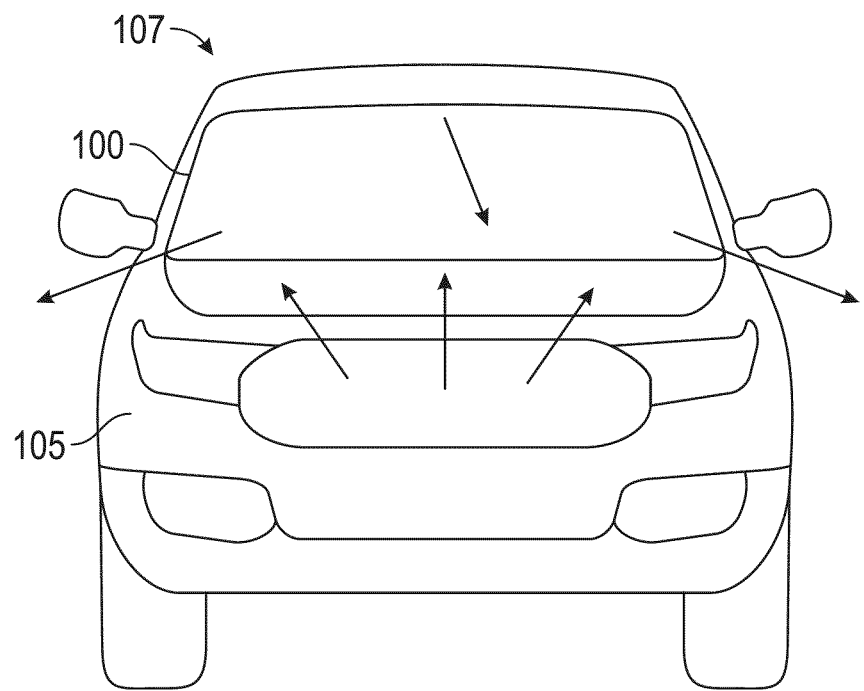
FIG. 7A is a schematic illustration of a vehicle having a reflector configured to reflect a transmitted beam into one or more single reflected beams according to one embodiment.

Referring now to FIG. 7A, in some embodiments, the transmitted beam is reflected by reflector 100 based on the position or portion of reflector 100 which is illuminated by the transmitted beam. For example, a plurality of substantially wavelength scale patterns of reflector 100 can be configured to produce a single reflected beam in response to a transmitted beam illuminating the reflector 100. The direction of the single reflected beam depends on which of the plurality of substantially wavelength scale patterns are illuminated by the transmitted beam. In other words, in response to a transmitted beam which illuminates the left side of reflector 100 a single side looking beam may be reflected. If the center portion of reflector 100 is illuminated instead, a single forward looking beam may be created by reflector 100.

Alternatively, the single beam can be produced from a plurality of transmitted beams or patterns where the patterns are configured to produce a single relatively coherent beam from reflector 100. For example, two transmitted beams may illuminate a center and side portion of reflector 100. A single relatively coherent beam may be reflected by reflector 100. Continuing the example, the single reflected beam may be a combination of a forward and side looking beam such that the beam is angled between forward looking and side looking.

In further embodiments, the plurality of substantially wavelength scale patterns of reflector 100 are configured to produce a plurality of reflected far-field beams in response to a transmitted beam illuminating reflector 100. The plurality of reflected far-field beams can have one or more directions based on one or more of the substantially wavelength scale patterns illuminated by the transmitted beam. For example, a single transmitted beam can create both forward looking and side looking beams as reflected by reflector 100.

Still referring to FIG. 7A, in some embodiments, reflector 100 (e.g., as a diffractive reflector) provides a fixed reflection pattern where the direction of a reflected transmitted beam depends on which portion of the reflector 100 is illuminated by the transmitted beam. The transmitted beam may be steered using a technique such as phasing antennas 103 to illuminate a specific portion of reflector 100. Illuminating a specific portion of reflector 100 can in turn produce one of the possible specific reflected beams (e.g., a side looking beam). The fixed reflection pattern can be created by the fixed curvature and angle of reflector 100 (e.g., as windshield 107 of vehicle 101). For example, reflector 100 can be or include optically transparent material which reflects radar waves. Reflector 100 need not include patterns or a plurality of patterns. For example, reflector 100 can be or include a metamaterial throughout such that reflector 100 is a non-specular reflector. Reflector 100 does not include a variety of patterns in some embodiments.

Alternatively, the fixed reflection pattern is created by reflector 100 including a plurality of patterns in or on reflector 100. The patterns may be formed of or include a metamaterial, a conductive material, or a nanowire mesh as previously described herein.

With a fixed reflection pattern, the direction of a reflected beam reflected by reflector 100 can be controlled by steering the transmitted beam. The transmitted beam can illuminate a specific portion of reflector 100. In one embodiment, control circuit 205 steers the transmitted beam by changing the angular distribution of gain of antenna 103 (e.g., antenna 103 including an array of antennas). In alternative embodiments, the pattern of a beam reflected from the diffractive reflector is dependent upon the frequency of the transmitted beam.

Figure 7B:
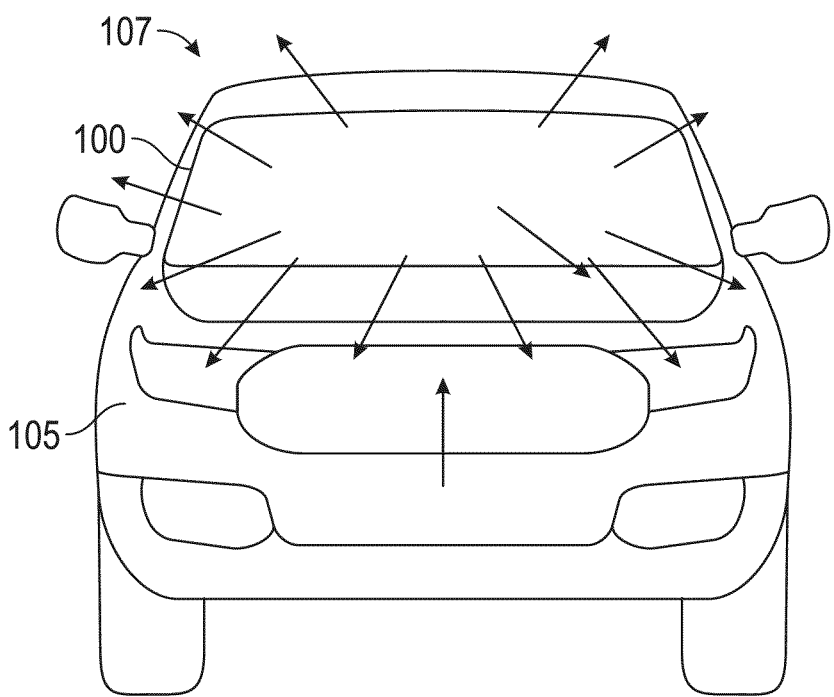
FIG. 7B is a schematic illustration of a vehicle having a reflector configured to reflect a transmitted beam into a plurality of beams with arbitrary directions.

Referring now to FIG. 7B, in alternative embodiments, reflector 100 includes one or more patterns which are configured to produce arbitrary beams from a transmitted beam. The reflected beams can have arbitrary beam patterns (e.g., directions and/or beam shapes). The reflected beams may be arbitrary in that the reflected beams are not reflected in a single or even a relatively few number of directions. The transmitted beam can be reflected in relatively many directions. The reflected beams can also be arbitrary in that the directions in which the beams are reflected are random or pseudorandom. The randomness or pseudo-randomness may be dependent upon the location of reflector 100 illuminated by the transmitted beam, the pattern illuminated by the transmitted beam, the frequency of the transmitted beam, the amplitude of the transmitted beam, the phase of the transmitted beam, the polarization of the transmitted beam, and/or other characteristics of the transmitted beam. The plurality of reflected far-field beams may also have arbitrary beam patterns. The substantially wavelength scale patterns may be configured to reflect a plurality of beams in a plurality of directions in response to being illuminated by the transmitted beam. The plurality of reflected far-field beams having arbitrary beam patterns can illuminate one more objects 203 and beams reflected from objects 203 can be used by a compressive sensing system (e.g., transceiver system 201).

Figure 8:
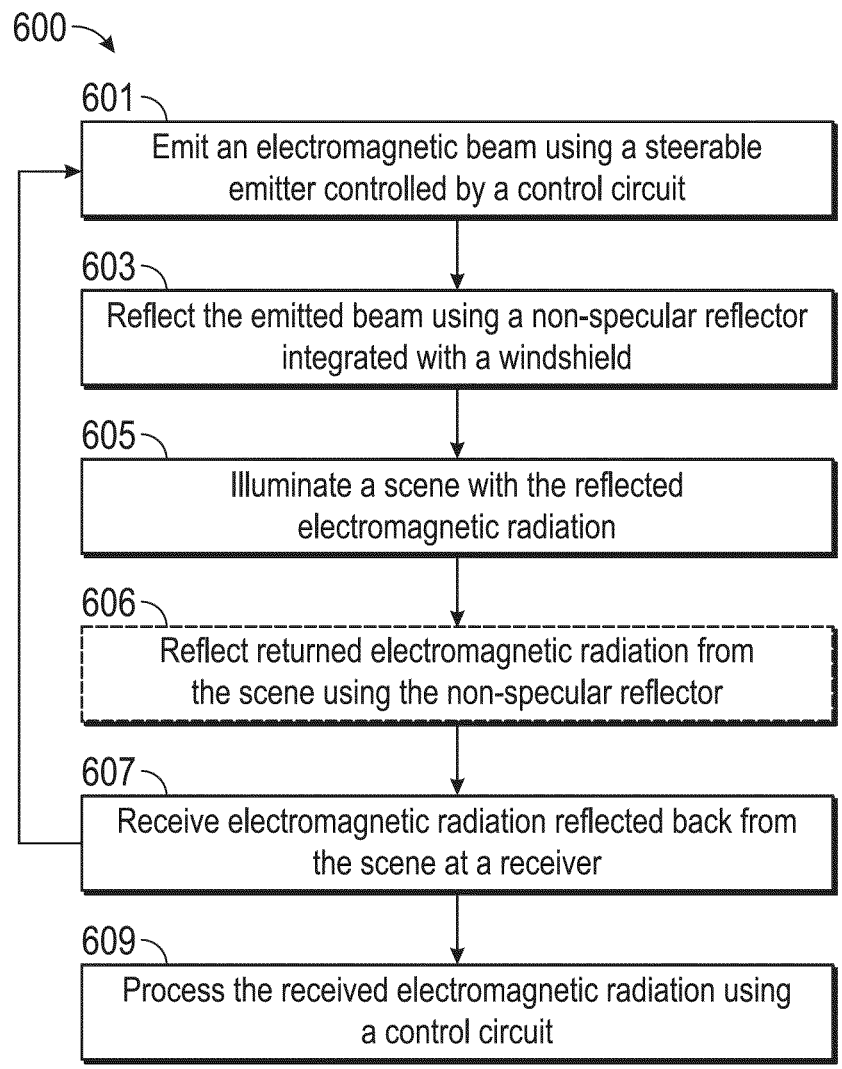
FIG. 8 is block diagram illustrating a method of obtaining information about an object using a reflector and transceiver system according to one embodiment.

Referring now to FIG. 8, method 600 for obtaining information about object 205 using, for example, reflector 100 and transceiver system 210 is illustrated according to one embodiment. An electromagnetic beam (e.g., radar beam, LIDAR beam, etc.) is emitted using a steerable emitter (e.g., by antenna 103) as controlled by control circuit 205 (601). Control circuit 205 can control antenna 103 using the techniques described herein such as actively phasing antennas 103. Control circuit 205 can also control the emitted beam such that the emitted radar beam has specific characteristics and/or parameters. For example, control circuit 205 can cause the emitted radar beam to have specific values of frequency, amplitude, phase, polarization, and/or other characteristics. Control circuit 205 can control antennas 103 such that the emitted beam illuminates a specific portion of reflector 100.

The emitted radar beam is reflected using a non-specular reflector (e.g., by reflector 100 integrated with a windshield) (603). Reflector 100 can reflect the beam based on a variety of factors. Factors may include the portion or specific location of reflector 100 illuminated, how reflector 100 is controlled (e.g., polarized), the characteristics of the emitted beam (e.g., frequency, amplitude, phase, etc.), and/or other factors. As previously explained herein, reflector 100 can reflect the emitted beam as a single beam or a plurality of beams. The reflected beam or beams may have directions and/or characteristics which differ from the transmitted beam as a result of being reflected by reflector 100. In some embodiments, the reflected beam or beams travel in specific directions (e.g., side looking beams and/or forward looking beams). In alternative embodiments, the reflected beams travel in arbitrary directions from reflector 100 and/or have arbitrary characteristics.

The reflected radar beam or beams from reflector 100 illuminate a scene with the reflected electromagnetic radiation (e.g., object 203 or a plurality of objects 203) (605). The reflected beam or beams can illuminate objects 203 which are within the beam pattern of the reflected beam. In some embodiments (e.g., when the reflected beams are arbitrary), a plurality of objects 203 and lack of objects 203 can be illuminated by the reflected beams from reflector 100. In response to being illuminated, objects 203 can reflect radar waves.

The reflected radar waves from the scene (e.g., objects 203) are received at a receiver (e.g., antenna 103) (607). In some embodiments, the electromagnetic radiation reflected by the scene is received directly at the receiver. In other embodiments, the electromagnetic radiation reflected by the scene is reflected by the non-specular reflector (e.g., reflector 100) prior to being received by the receiver (606). In some embodiments, the same antenna 103 which emits the transmitted beam receives the reflected radar waves from object 203. In alternative embodiments, separate antennas 103 emit and receive radar waves. The reflected radar waves from objects 203 can be received directly from objects 203.

Transceiver system 201 can repeat several iterations of emitting beams and receiving beams as described above. This can allow transceiver system 100 to gather a plurality of reflected signals from objects 203 for use in processing and/or determining information about objects 203.

Transceiver system 201 processes the received electromagnetic radiation which were reflected from the scene and received at the receiver (609). Control circuit 205 of transceiver system 201 can process the received radar waves. Processing the received radar waves can include applying traditional radar imaging and/or sensing techniques, algorithms, and/or programs. As previously described, the received radar waves can be processed to determine or estimate a variety of information about objects 203. For example, processing the received radar waves can include determining a distance to object 203, determining a speed of object 203, determining a trajectory of object 203, imaging object 203, and/or otherwise determining or estimating information about one or more objects 203.

In some embodiments, processing the received radar waves includes applying one or more compressive sensing algorithms to a set of received radar waves. For example, several iterations of emitted and reflected arbitrary radar waves can be used to illuminate objects 203. The reflected radar waves from objects 203 can be received and then processed. For example, control circuit 205 can apply a recovery algorithm to a sensing matrix including the several iterations of radar returns from objects 203. Control circuit 205 can process received radar waves at the end of several iterations of emitting and receiving radar waves or during the emission and reception of radar waves.

Referring generally to the figures, in an alternative embodiment, reflector 100 operates as a transmissive optical element rather than as a reflector or deflector. Although discussed throughout as a reflector 100, reflector 100 may be or operate as a transmissive optical element in some embodiments. The same or similar techniques as described herein for controlling beams using reflection can be used to control the operation of reflector 100 as a transmissive optical element. For example, metamaterials, conductive wire, nanowire mesh, and/or other materials which affect electromagnetic radiation may be incorporated into or on a substrate to affect electromagnetic radiation passing through reflector 100 while operating as a transmissive optical element. Thus, reflector 100, while operating as a transmissive optical element, can control the directions of beams which pass through the transmissive optical element to achieve the same or similar effects as described herein. For example, the transmissive optical element can direct a beam into forward or side looking beams, create arbitrary beams for use in compressive sensing, and/or otherwise alter the characteristics of a beam or beams entering the transmissive optical element for the purposes and functions described herein. The transmitted beam can enter the transmissive optical element from antenna 103 placed within the cabin of vehicle 101 as previously described herein. Radiation reflected from object 203 can be received at the same antenna 103 or a different antenna 103 (e.g., antenna 103 can be located outside of the cabin of vehicle 101).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A holographic reflector, comprising:
a surface including a plurality of regions of varying reflectivity, each of the plurality of regions comprising a metamaterial that changes either an amplitude or a phase of a reflected beam of electromagnetic radiation, wherein the holographic reflector is non-specular and forms part of a windshield for a vehicle, and
wherein the holographic reflector and the plurality of regions of varying reflectivity are configured to reflect electromagnetic radiation emitted from a fixed feed point positioned on an exterior of the vehicle in varying directions depending on which region of the surface reflects the electromagnetic radiation.

2. The reflector of claim 1, wherein the electromagnetic radiation is in a radar band, and the wavelength is a radar wavelength.

3. The reflector of claim 1, wherein the reflector comprises an amplitude hologram reflector.

4. The reflector of claim 1, wherein the reflector comprises a phase hologram reflector.

5. The reflector of claim 1, wherein the metamaterial comprises frequency-selective elements that interact differently with different frequencies.

6. The reflector of claim 1, wherein the reflector includes a dielectric sheet, and wherein the reflector is configured to produce a phase shift.

* * * * *